United States Patent [19]
Goodfellow et al.

[11] 3,804,425
[45] Apr. 16, 1974

[54] ROLLING CUTTER AND SEAL THEREFOR

[75] Inventors: Robert D. Goodfellow, Bedford, Pa.;
Donald W. Busby, Durango, Colo.

[73] Assignee: Subterranean Tools, Inc.,
Commerce City, Colo.

[22] Filed: Aug. 30, 1971

[21] Appl. No.: 175,870

[52] U.S. Cl............ 277/92, 277/95, 308/8.2
[51] Int. Cl............ F16j 15/34, F16c 19/49
[58] Field of Search........... 277/92, 95, 235 R, 42, 277/43, 94, 29; 308/8.2

[56] References Cited
UNITED STATES PATENTS

| | | | |
|---|---|---|---|
| 3,024,048 | 3/1962 | Kobert | 277/92 X |
| 3,370,895 | 2/1968 | Cason, Jr. | 277/95 X |
| 3,489,421 | 1/1970 | Neilson | 277/235 R |

Primary Examiner—Samuel B. Rothberg
Attorney, Agent, or Firm—Melvin A. Crosby

[57] ABSTRACT

The specification discloses a rolling cutter, especially for working rock formations and the like, and having a stationary central nonrotatable support port and an annular body part rotatable thereon with antifriction bearings interposed between the parts. The space in which the bearings are mounted is sealed to the rotary body by a nonmetallic seal ring, specifically, ceramic, which slidably engages the end of the adjacent antifriction bearing outer race which is pressed into sealing engagement with the race by a resilient rubber-like ring confined between the seal ring and a stationary cover at the respective end of the annular body.

2 Claims, 3 Drawing Figures

PATENTED APR 16 1974 3,804,425

INVENTOR.
ROBERT D. GOODFELLOW
BY DONALD W. BUSBY

3,804,425

ROLLING CUTTER AND SEAL THEREFOR

The present invention relates to rolling cutters and to seals therefor, and is particularly concerned with a sliding seal for sealing the interior of a rotary cutter to prevent grit and foreign material from getting into the bearing space.

Rolling cutters of the type disclosed herein are well known and are employed on tunnel boring machines and raise boring machines and the like for reducing formations such as rock during tunneling and boring operations. The cutters comprise a stationary center part and an annular body rotatably supported on the center part by bearings with seals being provided between the stationary supporting structure and the rotary body part to prevent dust and grit from getting into the bearing space.

A number of different types of seals have been employed for sealing the bearing space in such rotary cutters, but it has, heretofore, been difficult to arrive at a satisfactory sealing arrangement.

The grit developed during the reduction of rocks has an extremely fine component and it can be highly abrasive, and this material can quickly deteriorate seals and, if it gets past the seals into the bearing spaces and gets into the bearings and into the bearing lubricant, the bearings will deteriorate quite rapidly, and the entire cutter may be destroyed for this reason alone before the useful life thereof is realized.

Further, rolling cutters of the nature disclosed herein roll on hard rock formations and considerable shock is developed in the cutter because the rock does not reduce uniformly, and the cutter will not take a uniform path as it moves over the rock, and this will develop a great deal of shock loading in the cutter structure.

A seal, made of frangible material, can easily fracture under the shock loading conditions and thus become ineffective and, for this reason, certain materials that would otherwise be highly suitable for seals for rolling cutters have been excluded from use in rolling cutters.

With the foregoing in mind, a primary objective of the present invention is the provision of a seal arrangement for rolling cutters which is more efficient than heretofore known seals and which is, at the same time, quite inexpensive and highly resistant to breakage from shock loading imposed on the rolling cutter.

A further object of the present invention is the provision of a seal of the nature referred to which is quite compact so that it takes up only a small amount of space within the cutter structure.

A still further object of the present invention is the provision of a rolling cutter of the nature referred to having an improved seal arrangement therein to exclude fine grit from the bearing space inside the cutter.

These and other objects and advantages of the present invention will become more apparent upon reference to the following detailed specification taken in connection with the accompanying drawings in which.

BRIEF SUMMARY OF THE INVENTION

According to the present invention, a rolling cutter structure is provided having a central support shaft and a tubular body surrounding the support shaft with antifriction roller bearings interposed between the shaft and the body.

End caps mounted on the shaft have peripheral portions closely spaced from the end portions of the tubular body and a seal arrangement is disposed in the end caps near the peripheral portions thereof and at each end of the body and each includes a rubber-like ring engaged by the end cap and a ceramic ring which is pressed by the rubber ring against the end of the adjacent outer antifriction bearing race so as to form a sliding seal between the body of the rolling cutter and the stationary support structure therefor.

DETAILED DESCRIPTION OF THE INVENTION

Figure 1:
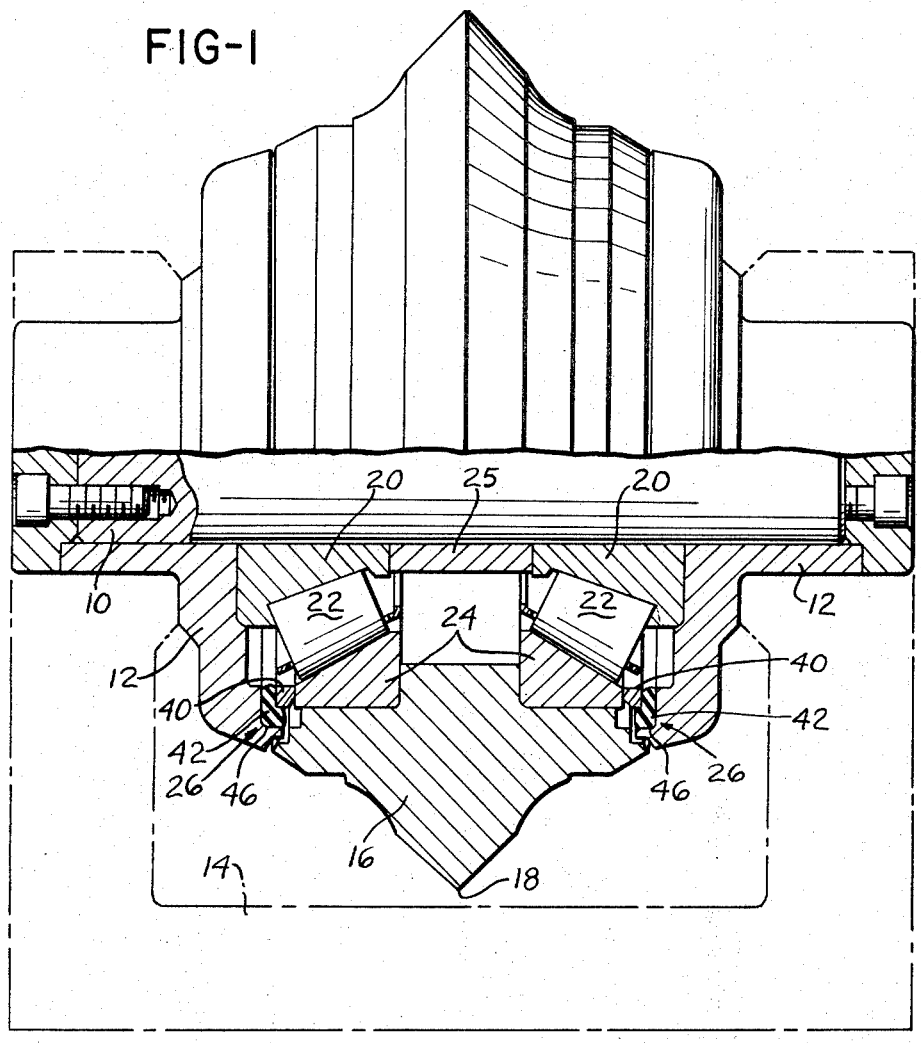
FIG. 1 is a schematic view, partly in section, showing a rolling cutter embodying a seal arrangement according to the present invention.

In FIG. 1, the rolling cutter will be seen to comprise a central shaft 10 on which is mounted hubs 12, with hubs 12 and shaft 10 being nonrotatably supported in a bracket arrangement 14, which may consist of individual arms, or which may be in the form of a "U" shaped bracket. The rotary part of the rolling cutter is in the form of a tubular annular body 16, which may be configured in any of several different manners, for example, conical, or cylindrical, or with one or more annular ribs.

Further, hard metal carbide inserts can be embodied in the body of the cutter if desired. The particular body part in FIG. 1 of the drawings has a single rib 18 extending thereabout in about the axial center.

Body part 18 is supported on shaft 10 by a pair of antifriction bearings, for example, tapered rolling bearings, each of which has an inner race 20, rollers 22, and an outer race 24. A space 25 on shaft 10 holds inner races 20 in fixed spaced relation, and these races are engaged at their axially outer ends by the hubs 12, which also serve as end caps for closing the ends of the annular body 16. According to the present invention, the interior of the body 16 is sealed by seal elements 26 of special construction and which form an important feature of the present invention.

The seal elements 26 are extremely important because the rolling cutter according to the present invention is used for reducing hard formations, such as rock, and in the process of this reduction, a great deal of fine grit is produced and which, if permitted to get into the inside of the rolling cutter, would quickly destroy the bearings therein.

For this reason, seals 26 are provided to seal the gap between the hubs, or end caps, 12 and the opposite ends of the annular body part 16.

In addition to establishing efficient sealing conditions to prevent the ingress of grit into the bearing space of the rolling cutter, the cutters must be able to withstand the considerable shock that is imparted to the cutter as it rolls on hard rock formations.

In the past, numerous sealing arrangements have been provided, including metal to metal seals according to the U.S. Robbins Pat. No. 3,216,513, but most sealing arrangements according to the prior art have proven defective, particularly in respect of having sufficient life, and not withstanding the grit, which the seal is required to exclude from the interior of the cutter structure, and in being quite expensive.

Figure 2:
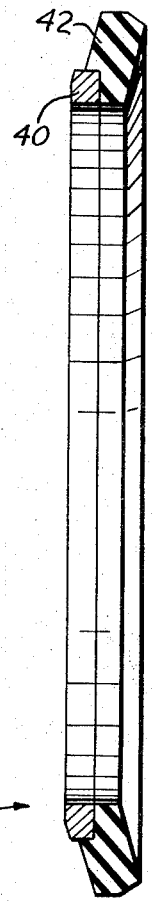
FIG. 2 is a sectional view showing the seal of the present invention.
Figure 3:
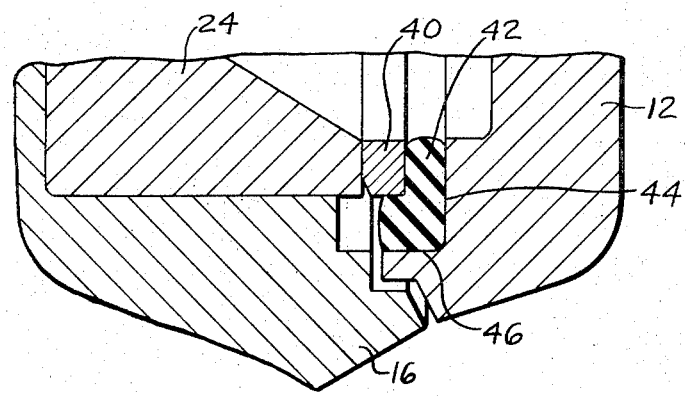
FIG. 3 is a fragmentary view drawn at enlarged scale showing the seal according to the present invention in place in the rolling cutter.

According to the present invention, the sealing arrangement is made highly efficient, and at the same time, inexpensive and quite strong by employing the seal shown more in detail in FIGS. 2 and 3. This seal is particularly characterized in the provision of a ceramic ring 40 which is associated with a resilient rubber-like ring 42.

These two rings may be bonded together or they may be provided separately and installed in the cutter assembly as individual parts. A certain advantage obtains in having the two rings bonded together because it makes the handling thereof somewhat more simple and also assists in preventing any possible leakage of grit between the rings when the cutter is in use.

FIG. 3 shows more in detail how the seal ring is embodied in the cutter structure. In FIG. 3, it will be seen that the ceramic ring 40 slidably engages the axially outer end of the adjacent outer race 24, while the rubber-like ring 42 engages the axially inner side of the adjacent hub or end cap 12. The rubber-like ring 42 is held in a state of compression by engagement with the hub or end cap in the radial region 44 and also in the axial region 46.

It will be noted that the rubber-like ring 42 also engages ceramic ring 40 on the axially outer side and also on the radially outer side thereof. The ceramic ring 40 is thus held in both axial and radial compression, while being resiliently supported by rubber-like ring 42, so that the ceramic ring is cushioned and does not tend to become broken from shocks exerted on the rotatable body part 16 of the cutter, while at the same time, the ceramic ring is firmly held against the end of the adjacent bearing race 24.

The ceramic ring 40 is hard and will slide on the bearing race and the bearing race and ring and will wear together and form interengaging surfaces which mate substantially perfectly with each other in grit excluding relation. The rubber-like ring 42 firmly engages the hub or end cap in grit excluding relation, and the arrangement is, therefore, such that no grit is permitted to get into the bearing space inside the cutter assembly.

Similarly, lubricant is retained in the bearing space without leakage, even if some pressure develops thereon while the cutter is in use. In this connection, it will be noted that no area on the seal is presented to pressure inside body 16 in such a manner as to develop any force on the seal tending to separate ring 40 from race 24. Rather, any pressure in body 16 will act on resilient ring 42 in the radially outer direction and enhance the effectiveness of the seal.

The rubber-like ring 42 can, if desired, be cemented into the adjacent hub or end cap and, as mentioned, can be installed in the cutter separately from ring 40, if so desired.

The seal ring according to the present invention is relatively inexpensive and the support provided for the ceramic ring minimizes the chance of breakage thereof, while the extreme hardness of the ceramic ring and of bearing race 24 prevent these elements from being abraded away by any particles of grit that get into the region surrounding the seal ring arrangement.

For the rubber-like ring portion which simultaneously seals against the end cap and the ceramic ring and develops pressure on the ceramic ring, a natural rubber can be used if the lubricant in the rolling cutter is compatible therewith. However, use of synthetic rubbers, such as silicon rubbers, and elastomeric plastics, is contemplated in the event that the lubricant employed is of such a nature that natural rubber would swell or otherwise deteriorate in the presence of the lubricant.

Other shapes are possible for the ceramic part, and other shapes are also possible for the rubber-like part, and it will be understood that modifications of this nature, which fall within the scope of the appended claims, are included within the purview of this invention.

What is claimed is:

1. A seal ring, especially for a rolling cutter, and comprising; a ceramic ring substantially rectangular in cross section and having a radial annular face on one axial side adapted for sliding sealing face to face engagement with the planar radial end face of an antifriction bearing opposed thereto, and a substantially frusto-conical resilient rubber-like ring, said frusto-conical resilient rubber-like ring having an annular notch formed in the smaller end thereof with an axially facing radial surface and a radially inwardly facing peripheral surface, said ceramic ring having the outer periphery thereof and the axial side thereof opposite said one axial side seated in said notch and fixed to said resilient rubber-like ring, said ceramic ring protruding axially from the smaller end of said resilient rubber-like ring so as to expose said one axial side thereof for engagement with the bearing race to be sealed.

2. A seal ring according to claim 1 in which the inside diameter of said resilient rubber-like ring is about equal to the inside diameter of said ceramic ring, said resilient rubber-like ring protruding radially outwardly beyond the outside diameter of said ceramic ring and also extending axially away from said ceramic ring whereby axial compression of said resilient rubber-like ring toward said ceramic ring while said rubber-like ring is radially confined will develop axial thrust on said ceramic ring with simultaneous radial compression of said resilient rubber-like ring to develop radial compressive forces on said ceramic ring.

* * * * *